Patented Apr. 28, 1942

2,280,827

UNITED STATES PATENT OFFICE 2,280,827

METHOD OF FREEZING AND PRESERVING FOODSTUFFS

John Charles Hoveman, Paris, France, assignor to Dewey and Almy Chemical Company, Cambridge, Mass., a corporation of Massachusetts No Drawing. Application October 1, 1936, Serial No. 103,532. In Germany October 4, 1935

2 Claims. (Cl. 99—192)

One of the drawbacks of the present methods of freezing meat and other foodstuffs is that in order to bring the foodstuffs to the required low temperature, it requires a very long time and the foodstuffs do not satisfactorily withstand the immersion in a freezing medium at very low temperatures. For example to freeze an ox's thigh, it is necessary to place it in air in an enclosure at about —20° C.; it requires about seventy-two hours. Now certain foodstuffs, in order to retain their qualities, must be cooled very quickly. This is the case, for example, with animal organs such as ovaries, kidneys, brains and endocrine glands such as thyroid and hypophysis bodies. Such glands are intended to be used by dissecation for certain medicinal preparations, owing to the vital principles which they contain. Such vital principles are very unstable and are transformed after a short time, two to three hours for example, if they are not quickly stabilized by cold in their living state. At the present time, in order to attain this result, it is necessary to freeze the products in an enclosure in air at about —40° C., which necessitates a special and very costly apparatus.

On the other hand, most of the foodstuffs preserved by cold dry superficially in the atmosphere of the cold chambers and this modifies their outward appearance. Such drying causes a considerable loss of weight, of about 1% per month for meat.

The invention hereinafter described has for its object a novel method of preserving foodstuffs by cold which in particular enables the use, for any foodstuff, of the rapid cooling which is obtained by immersion or by spraying in any cold medium, in particular in the freezing fluids themselves, for example in the liquid ammonia inside the evaporators.

It enables the losses of weight which ensue from freezing or preserving the foodstuffs to be avoided. It prevents the alterations of colour and taste of the superficial layers of the foodstuffs.

It has already been proposed to introduce the foodstuffs to be frozen, in particular fish, into a metal casing which remains open at one end and to partially immerse said metal casing in a freezing medium. However, this solution is totally unsatisfactory, since on the one hand such a metal casing, however thin it may be, cannot come into intimate contact with the foodstuffs to be frozen over the whole surface of same, in spite of the pressure of the refrigerated liquid, and layers of air necessarily subsist in numerous places between the casing and the foodstuffs, forming a sort of insulating cushion; this drawback is particularly troublesome in the case of foodstuffs of irregular shape having projecting portions and convex surface elements adjacent concave surface elements, as is often the case for large sections of meat, thereby rendering the metal casings totally useless. On the other hand, owing to the fact that said casings are open at one end, the foodstuff is in permanent contact with the surrounding air, a fact which in the first place causes freezing to take place more slowly and in the second place prevents the foodstuff from being shielded from microbes, which is a particular drawback in the case of products intended for pharmaceutical preparations. Furthermore, the existence of a permanent opening in the casing causes a loss of weight whereas the pressure due to the resiliency of the metal casing alters the appearance and often the quality of the product.

The method which is the object of the present invention has for its object to eliminate the drawbacks which have just been enumerated and it is characterized by the fact that the impervious casing containing the foodstuffs, which casing is cooled by the immersion or spraying, is made of a flexible material which is preferably resilient such as rubber or a rubber coated fabric, and said casing is brought into intimate contact with the foodstuff by a vacuum or pressure and is hermetically sealed.

When the foodstuffs are to be consumed, the thawing or the mere warming up of the foodstuffs within the hermetic casing by a flow of temperate water, will easily be effected and with advantages of cleanliness unknown with other systems.

This flexible bag, without air, in intimate contact with the foodstuff, gives the latter an excellent protection during the whole time it is preserved, i. e., stored, shielding it from the air and from taint of any kind, in particular during handling. It enables, as mentioned above, the product to be immersed in freezing mediums on the sole condition of choosing for the membrane a body which is not attached by said medium.

Such a result will be obtained in a practical manner by enclosing the foodstuff inside a flexible bag of a material which is impervious, i. e., which prevents air and vapor transfer, in particular made of rubber or rubber coated fabric by driving the air out of the bag, in particular by creating a vacuum, or by applying thereto an outer pressure by means of liquid or gaseous fluid.

By the term "rubber," as used in the specification and claims, I intend to include both natural and artificial substances which possess substantially the flexibility or resilience and other physical characteristics of natural rubber or rubber coated fabric and the term "rubber material" as used in the claims is intended to cover an envelope including such substances.

The expulsion of the air from the flexible bag will compel the latter to press intimately against the foodstuff contained therein. Said bag thus pressed will naturally make folds around the object.

Under these circumstances, an ox's thigh enclosed in a thin rubber bag from which the air has been exhausted, can be immersed in a freezing medium at −20° C. and will be frozen in about ten hours instead of seventy-two. Opotherapic glands and similar products thus enclosed can be immersed in a freezing medium at −15° C. and will be frozen in less than an hour.

The bag can consist of two flexible membranes joined together mechanically (for the purpose of freezing by continuous movement).

I claim:
1. The process of preserving meat and other foodstuffs by refrigeration which comprises placing the foodstuff in a thin, flexible and impervious casing of rubber material, bringing the casing into intimate contact with the foodstuff by removing the air from within the casing, sealing the casing hermetically, freezing the enclosed meat and storing it under freezing conditions which would otherwise permit evaporation of moisture from the foodstuff while sealed in the casing for a time long enough to cause deterioration of similar unprotected foodstuff.

2. The process of preserving meat and other foodstuffs by refrigeration which comprises placing the foodstuff in a thin, flexible and impervious casing of rubber material bringing the casing into intimate contact with the foodstuff by removing the air from within the casing, sealing the casing hermetically, freezing the enclosed meat and storing it under freezing conditions which would otherwise permit evaporation of moisture from the foodstuff while sealed in the casing for a time long enough to cause deterioration of similar unprotected foodstuff and thawing the foodstuff while maintaining the casing as a covering thereon.

JOHN CHARLES HOVEMAN.